(12) United States Patent
Feisel

(10) Patent No.: US 11,844,338 B1
(45) Date of Patent: Dec. 19, 2023

(54) FISHING LURE

(71) Applicant: Bryan C. Feisel, Hudson, WI (US)

(72) Inventor: Bryan C. Feisel, Hudson, WI (US)

(73) Assignee: Bryan C. Feisel, Hudson, WI (US)

( * ) Notice: Subject to any disclaimer, the term of this patent is extended or adjusted under 35 U.S.C. 154(b) by 0 days.

(21) Appl. No.: 18/112,918

(22) Filed: Feb. 22, 2023

(51) Int. Cl.
*A01K 85/18* (2006.01)
*A01K 85/00* (2006.01)

(52) U.S. Cl.
CPC .......... *A01K 85/1881* (2022.02); *A01K 85/18* (2013.01)

(58) Field of Classification Search
CPC .... A01K 85/18; A01K 85/1881; A01K 97/01; A01M 31/06
USPC .................................................... 43/42.15, 2
See application file for complete search history.

(56) References Cited

U.S. PATENT DOCUMENTS

| | | | | |
|---|---|---|---|---|
| 51,120 | A * | 11/1865 | Quinby | A01K 85/00 362/477 |
| 777,382 | A * | 12/1904 | Beau | A01K 69/06 43/41 |
| 1,188,583 | A * | 6/1916 | Townsend | A01K 85/16 43/42.22 |
| 1,786,568 | A * | 12/1930 | Kutz | A01K 85/18 43/42.34 |
| 2,054,407 | A * | 9/1936 | Campbell | A01K 85/16 43/27.4 |
| 2,556,533 | A * | 6/1951 | Graaten | A01K 85/18 43/42.22 |
| 2,746,194 | A * | 5/1956 | Lonnman | A01K 97/01 297/183.1 |
| 2,789,385 | A * | 4/1957 | Seeger | A01K 85/18 43/42.15 |
| 2,933,847 | A * | 4/1960 | Frasure | A01K 85/14 43/41 |
| 3,123,932 | A * | 3/1964 | Austin, Jr. | A01K 85/18 43/42.09 |
| 3,186,120 | A * | 6/1965 | Layson | A01K 85/00 43/2 |
| 3,196,574 | A * | 7/1965 | Weimer | A01K 85/16 D22/126 |
| 3,271,897 | A * | 9/1966 | Gelinas | B29C 66/246 446/153 |

(Continued)

FOREIGN PATENT DOCUMENTS

| | | | |
|---|---|---|---|
| FR | 909599 | A * | 5/1946 |
| JP | 2006006199 | A * | 1/2006 |

(Continued)

OTHER PUBLICATIONS

Translation of JP 2007-53956 A (Year: 2007).*

*Primary Examiner* — Darren W Ark
(74) *Attorney, Agent, or Firm* — SCHWEGMAN LUNDBERG & WOESSNER, P.A.

(57) ABSTRACT

Various aspects disclosed relate to a fishing lure. The fishing lure includes a body portion having a longitudinal axis extending therethrough. The fishing lure further includes a tail portion and a jointed connection between the body portion and the tail portion. The body portion includes at least two biasing elements each extending from opposite sides of the body portion at an angle in a range of from about 30 degrees to about 65 degrees relative to the longitudinal axis. The at least two biasing elements are each configured to selectively contact opposed surfaces of the tail portion.

13 Claims, 5 Drawing Sheets

(56) References Cited

U.S. PATENT DOCUMENTS

| | | | | |
|---|---|---|---|---|
| 3,279,117 A | * | 10/1966 | Weimer | A01K 85/16 43/42.23 |
| 3,313,058 A | * | 4/1967 | Fuerst | A01K 85/18 43/42.15 |
| 3,942,280 A | * | 3/1976 | Ryder | A01K 85/18 43/42.22 |
| 4,226,508 A | * | 10/1980 | Michaels | G02B 27/022 359/895 |
| 4,550,518 A | * | 11/1985 | Layson | A01K 97/00 43/2 |
| 4,862,626 A | * | 9/1989 | Hamaguchi | A01K 85/00 43/4.5 |
| 4,916,845 A | * | 4/1990 | Aydelette, Sr. | A01K 97/02 43/4 |
| 5,906,067 A | * | 5/1999 | Layson | A01K 97/02 43/2 |
| 5,924,236 A | * | 7/1999 | Preston | A01K 85/16 43/42.31 |
| 5,950,345 A | * | 9/1999 | Kilander | A01K 85/00 43/2 |
| 6,171,667 B1 | * | 1/2001 | Kostic | G09F 19/08 428/16 |
| 6,453,599 B2 | * | 9/2002 | Mathews | A01K 85/18 43/42.31 |
| 6,820,366 B1 | * | 11/2004 | McDermott | A01K 85/16 43/42.22 |
| 7,114,284 B2 | * | 10/2006 | Kato | A01K 85/18 43/42.31 |
| 7,134,235 B2 | * | 11/2006 | Gifford | A01K 85/00 43/2 |
| 7,322,226 B1 | * | 1/2008 | Rathgeb | A01K 85/00 43/2 |
| 11,589,565 B1 | * | 2/2023 | Chan | A01K 85/01 |
| 2007/0289196 A1 | * | 12/2007 | Scott | A01K 85/18 43/42.15 |
| 2008/0115402 A1 | * | 5/2008 | Helmin | A01K 85/18 43/42 |
| 2019/0246612 A1 | * | 8/2019 | Shunk | A01K 85/18 |
| 2021/0386044 A1 | * | 12/2021 | Coniglio | A01K 85/18 |
| 2022/0361466 A1 | * | 11/2022 | Kokuga | A01K 85/18 |

FOREIGN PATENT DOCUMENTS

| | | | | |
|---|---|---|---|---|
| JP | 2007053956 A | * | 3/2007 | |
| JP | 4476035 B2 | * | 6/2010 | |
| JP | 2015043713 A | * | 3/2015 | |
| JP | 5931504 B2 | * | 6/2016 | |
| JP | 2019097526 A | * | 6/2019 | |
| JP | 2019103409 A | * | 6/2019 | |
| KR | 20060048328 A | * | 5/2006 | |
| WO | WO-2015105170 A1 | * | 7/2015 | A01K 85/00 |
| WO | WO-2017074516 A1 | * | 5/2017 | A01K 85/00 |

* cited by examiner

FISHING LURE

BACKGROUND

A lure is an artificial bait used in fishing to attract fish. It is designed to mimic the movement and appearance of real prey, such as insects, worms, or small fish, in order to entice fish to strike and bite.

Lures can be made of a variety of materials, including metal, plastic, rubber, and feathers, and they come in many different shapes, sizes, and colors. However, most lures share some common features that help them attract fish.

One of the key ways a lure attracts a fish is through movement. The way the lure moves through the water can mimic the motion of a real prey item, such as a swimming fish or a struggling insect. Some lures, like spinners or crankbaits, are designed to create a lot of movement and vibration in the water, which can be especially effective in murky or low-light conditions.

Another important factor is color and pattern. Different fish are attracted to different colors and patterns, depending on their natural prey and the conditions of the water. For example, a bright, flashy lure may work well in clear, sunny water, while a more subdued, natural-colored lure may be better in murky or overcast conditions.

In addition to movement and color, some lures also incorporate scents or sound to attract fish. For example, some soft plastic lures may be infused with fish-attracting scents, while other lures, like poppers or buzzbaits, create noise or splashing on the water's surface to grab the attention of nearby fish.

SUMMARY OF THE DISCLOSURE

Various aspects disclosed relate to a fishing lure. The fishing lure includes a body portion having a longitudinal axis extending therethrough. The fishing lure further includes a tail portion and a jointed connection between the body portion and the tail portion. The body portion includes at least two biasing elements each extending from opposite sides of the body portion at an angle in a range of from about 30 degrees to about 65 degrees relative to the longitudinal axis. The at least two biasing elements are each configured to selectively contact opposed surfaces of the tail portion.

BRIEF DESCRIPTION OF THE FIGURES

The drawings illustrate generally, by way of example, but not by way of limitation, various aspects of the present disclosure.

DETAILED DESCRIPTION OF THE DISCLOSURE

Figure 1:
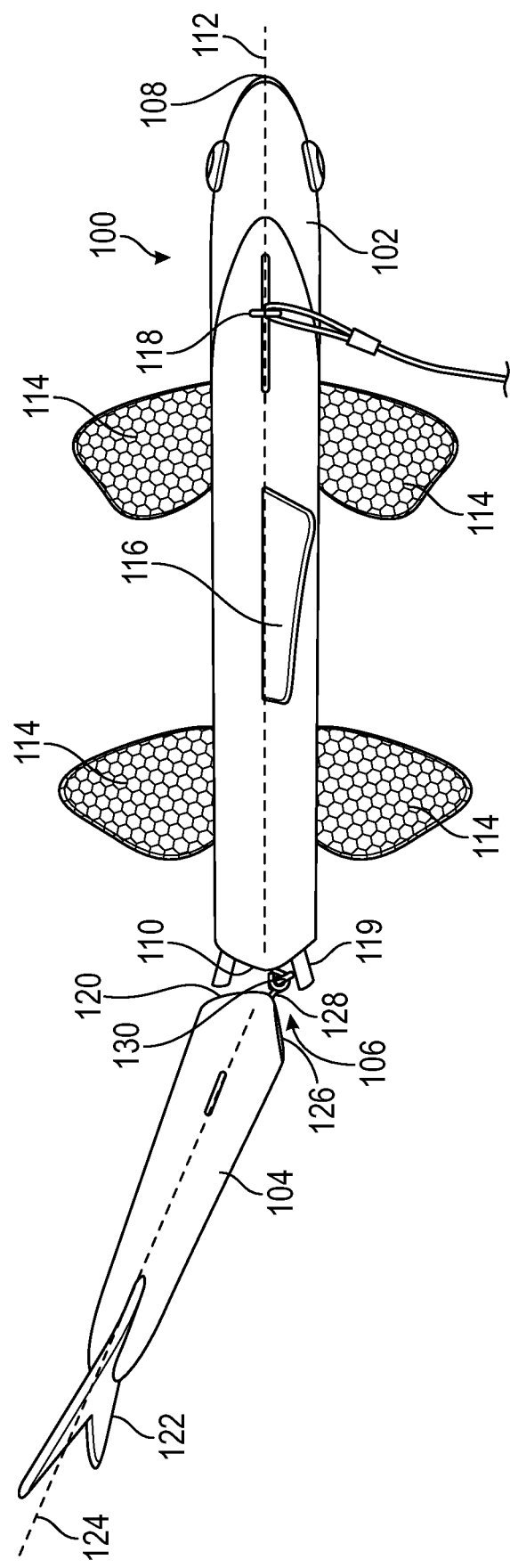
FIG. 1 is a top view of a fishing lure of the instant disclosure oriented to swim left.

Reference will now be made in detail to certain aspects of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about wt % or less, or less than or equal to about 4.5 wt %, 4, 3.5, 3, 2.5, 2, 1.5, 1, 0.9, 0.8, 0.7, 0.6, 0.4, 0.3, 0.2, 0.1, 0.01, or about 0.001 wt % or less, or about 0 wt %

The present disclosure relates to fishing lures and, more particularly, relates to a fishing lure whose movement and direction of travel through the water can be controlled by the user tugging or jerking on a rod and line or a jig attached to the fishing lure Sport fishing is one of the most popular recreational activities and pastimes for men and women, young and old, amateur as well as professional. All aspects of the sport have become highly specialized, and this includes the material composition for the rods, the internal winding or spool mechanism for the reels, the spears, and the countless types of artificial lures and bait. All types of fishermen have used a wide variety of lures, and these include flies, rubber worms, spoons, spinners, plugs, and minnow-like devices. Fishermen have long known that it is highly advantageous to use lures that move or oscillate in some manner as they are drawn through the water during the process of the user reeling in the fishing line. The periodic or continuous movement or oscillation of the lure through the water enhances the possibility that the lure will attract a targeted fish.

Figure 2:
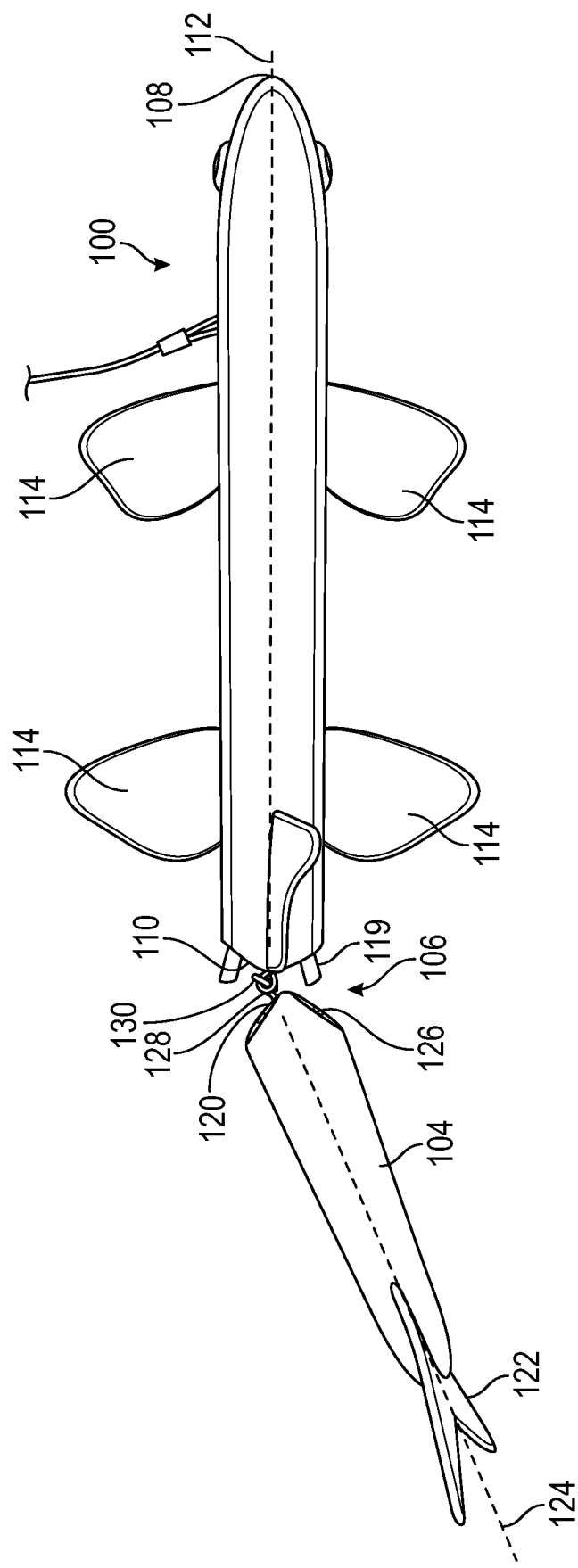
FIG. 2 is a bottom view of the fishing lure of FIG. 1
Figure 3:
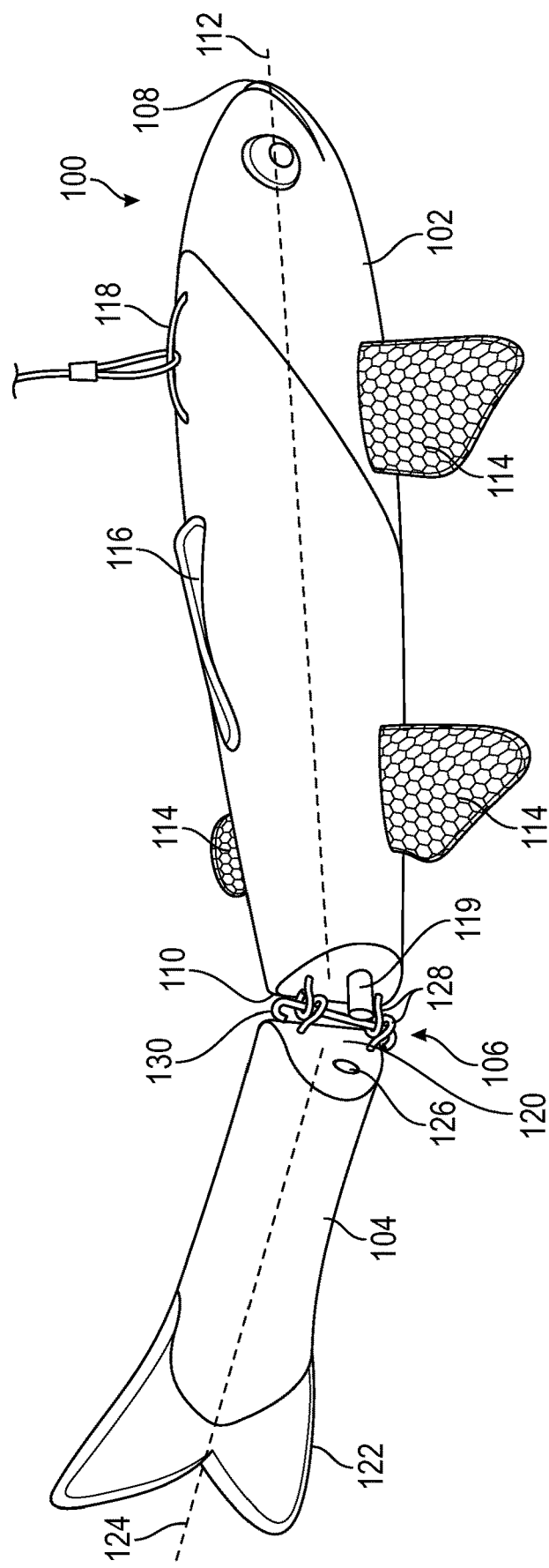
FIG. 3 is a side view of the fishing lure of FIGS. 1 and 2.
Figure 4:
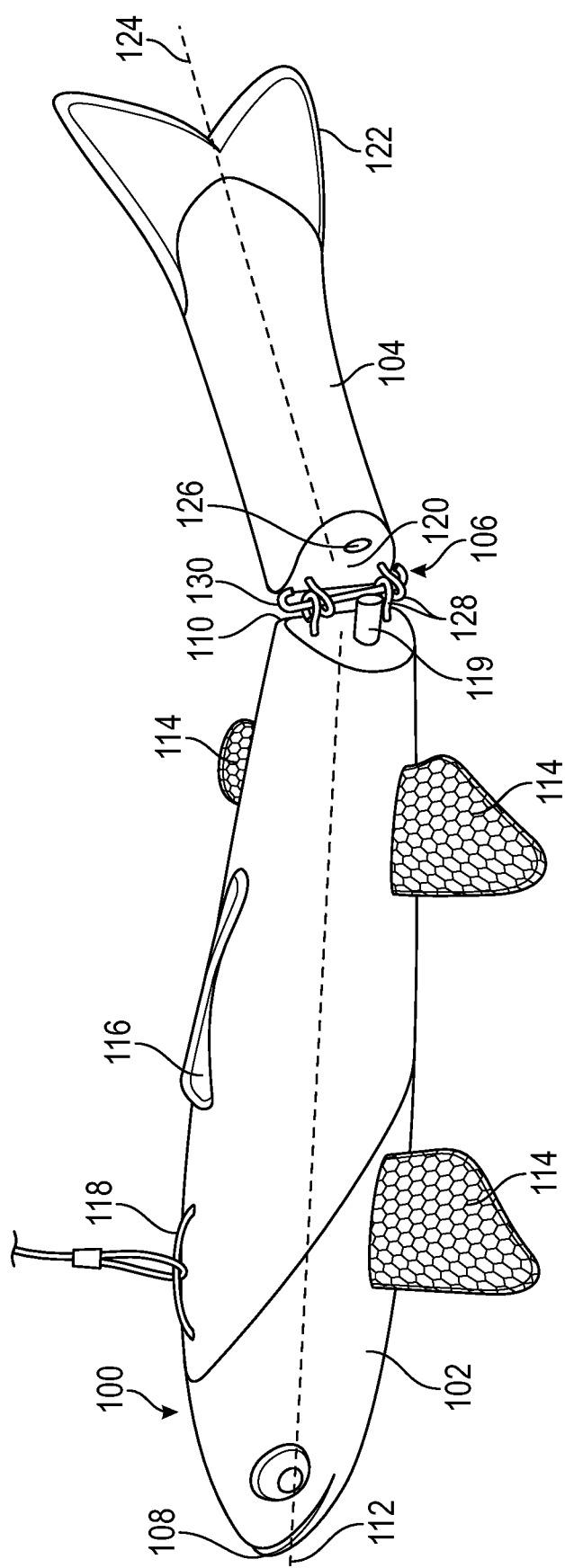
FIG. 4 is a side view of the fishing lure oriented to swim right.
Figure 5:
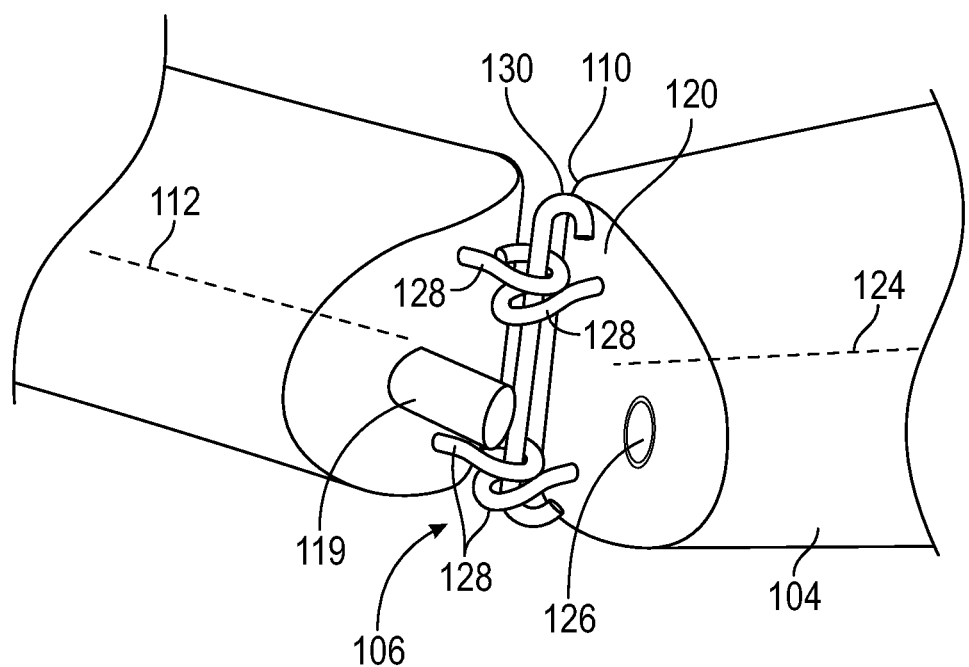
FIG. 5 is a side view of a jointed connection of the fishing lure oriented to swim right.

According to various aspects of the present disclosure, fishing lure 100 is shown in FIGS. 1-5. FIGS. 1-5 show many of the same components are discussed concurrently. As shown in FIGS. 1-5, fishing lure 100 includes body portion 102, tail portion 104, jointed connection 106. Body portion 102 includes first end 108, second end 110, first longitudinal axis 112, fins 114, dorsal fin 116, fastener 118, and biasing elements 119. Tail portion 104 includes third end 120, fourth end 122, second longitudinal axis 124, and receiving portion 126. Jointed connection 106 includes fasteners 128 and pin 130.

On the whole, fishing lure 100 is designed mimic or resemble a fish. Fishing lure 100, will resemble or mimic a fish to such an extent that it can be used to attract a fish so that the fish is at least drawn near fishing lure 100. Body portion 102 resembles the "head" portion of a fish. Body portion 102 extends from first end 108 to second end 110. First longitudinal axis 112 extends through first end 108 and second end 110. First longitudinal axis 112 extends about a length of body portion 102. The length of body portion 102 is the major (e.g., largest) dimension of body portion 102. That is the length of body portion 102 is larger than its height or depth.

Body portion 102 includes a number of fins. For example, body portion 102 includes a fins 114, which extend from a side of body portion 102. Body portion 102 can additionally include dorsal fin 116 on the top of body portion 102. Body portion 102 additionally includes fastener 118. Fastener 118 functions to allow for a connection of a line to fishing lure 100. The line can be a line from a jig or a fishing rod. As shown, in FIGS. 1-5, fastener 118 is located on the back of body portion 102, adjacent to dorsal fin 116. In different constructions, it is possible to located fastener 118 at or near first end 108. This can be helpful if fishing lure 100 is designed to be used with a fishing rod as opposed to jig.

Body portion 102 can be made of many different materials. For example, body portion 102 can be made of wood, metal, or plastic. In some examples, body portion 102 can be made of wood but have metal incorporated at selected locations. For example, body portion 102 can have a piece of metal implanted in it to serve as a weight to reduce the buoyancy of fishing lure 100. Fins 114, dorsal fin 116, and fastener 118 can be made of wood, metal, or plastic. In some examples, it may be desirable to form fins 114, dorsal fin 116, and fastener 118 from a metal. This is because the metals can be shinny when exposed to light. This in turn can make fishing lure 100 more attractive to a fish. Metals used in fishing lure 100 are typically resistant to corrosion.

Tail portion 104 includes third end 120 and fourth end 122. Tail portion 104 resembles the "tail" portion of a fish. Tail portion 104 extends from third end 120 to fourth end 122. Second longitudinal axis 124 extends through third end 120 and fourth end 122. Second longitudinal axis 124 extends about a length of tail portion 104. The length of tail portion 104 is the major (e.g., largest) dimension of tail portion 104. That is the length of tail portion 104 is larger than its height or depth.

Fourth end 122 resembles a tail. The tail can be integral to tail portion 104 or a separate piece that is attached to tail portion 104. Tail portion 104 can be made of many different materials. For example, tail portion 104 can be made of wood, metal, or plastic. In some examples, tail portion 104 can be made of wood but have metal incorporated at selected locations. In some examples, it may be desirable to fourth end 122 from a metal. This is because the metals can be shinny when exposed to light. This in turn can make fishing lure 100 more attractive to a fish.

Body portion 102 and tail portion 104 are joined by jointed connection 106. Jointed connection allows for a user to control movement of body portion 102 relative to tail portion 104. Jointed connection 106 is formed between second end 110 and third end 120. As shown in FIGS. 1-5, biasing elements 119 extend from second end 110. Relative to first longitudinal axis 112, each of biasing elements 119 extends at an angle in a range of from about degrees to about 65 degrees, about 40 degrees to about 55 degrees, less than, equal to, or greater than about 30 degrees, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or about 65 degrees. As shown, jointed connection 106 is located in a range of from about 50% to about 75% of a total length of fishing lure 100, about 60% to about 70%, less than, equal to, or greater than about 50%, 51, 52, 53, 54, 55, 56, 57, 58, 59, 60, 61, 62, 63, 64, 65, 66, 67, 68, 69, 70, 71, 72, 73, 74, or about 75% of the total length of fishing lure 100.

Receiving portions 126 are located on third end 120. Receiving portions 126 are located such that they can selectively contact an end of a respective biasing element 119. As shown in FIGS. 1-5, receiving portions 126 each include an indentation. While not so limited, a major dimension of each receiving portion 126 can be in a range of from about 1 mm to about 5 mm, about 2 mm to about 4 mm, less than, equal to 1 mm, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, or about 5 mm.

As shown in FIGS. 1-5, jointed connection 106 includes a plurality of fasteners 128. Some fasteners 128 are attached to second end 110 and some are attached to third end 120. Fasteners 128 can be a d-ring, eyelet, nut, or any component that can allow pin 130 to pass therethrough. Pin 130 is shown to be a robust wire. In other examples, pin 130 can be a solid metal pin, wooden dowel, or any other component that can pass through fasteners 128. Jointed connection 106 can be considered to be a hinged connection. A hinged connection is a joint or connection between two objects that allows rotational movement in one or more directions. The joint includes of a hinge that connects the two objects and enables them to pivot or rotate relative to each other. Hinged connections are commonly used in structures such as doors, gates, bridges, and other mechanical systems where rotation is necessary for operation or movement. The hinge is designed to withstand the forces and stresses that are exerted on the joint during use, while also allowing for smooth and controlled movement.

As an example, fishing lure 100 can be used for spear fishing or ice spearing. Ice spearing is a traditional method of catching fish that has been used for centuries. It involves using a long, sharpened spear to pierce and catch fish that are swimming in a hole in the ice.

To start, the ice must be thick enough to support the weight of the user and provide a safe and stable surface for fishing. Once a suitable spot has been identified, a hole is drilled into the ice using an auger. The hole is usually about 8 to 10 inches in diameter, but can vary depending on the size of the fish being targeted The spear used for ice fishing is typically made of wood or metal and can be several feet in length. It has a sharp, pointed end that is used to pierce and impale the fish.

A fish is typically lead towards the hole using fishing lure 100. Fish lures are an effective tool used in ice fishing for attracting fish to the spearing hole. A fish lure that closely resembles prey of the type of fish a user is trying to catch. Fishing lures come in various shapes, sizes, and colors, so it's essential to choose one that looks like the prey of your target fish. Before lowering the fishing lure 100 into the water, it is rigged to fastener 118 by tying a line thereto. Once rigged, fishing lure 100 is positioned in the water. Specifically, fishing lure 100 is lowered into the hole and allowed it to sink to the desired depth. A jigging motion to make the decoy appear more lifelike and attract fish.

The spear is usually held in one or both hands, depending on its length, and is lowered into the water until the fish comes into view. When a fish is spotted, the spear is quickly thrust downward, aiming to impale the fish. The user must be quick and accurate to successfully spear the fish, as they can swim away quickly. If the fish is hit, it is lifted out of the water and onto the ice.

In general, fishing lure 100 is jigged up and down to create movement that will attract fish. The amount and speed of jigging will depend on the type of lure and the fish you are targeting. Some fish may prefer a slow, subtle jig while others may respond better to a more aggressive jig.

A particular advantage of the instant fishing lure 100 is that by virtue of jointed connection 106, the user controlling the jig (usually a handheld device that is attached to the line attached to fishing lure 100) can selectively orient fishing lure 100 such that it can "swim" left or right. Alternatively, a user can control fishing lure 100 to be in a resting position where longitudinal axis 112 and longitudinal axis 124 are substantially aligned. For example, a user in control of the jig, can move the jig in such a way that that biasing element 119 on the right side of fishing lure 100 abuts receiving portion 126 on the right side of fishing lure 100. In this orientation, an angle between body portion 102 and tail portion 104 can be in a range of from about 30 degrees to about 65 degrees, about 40 degrees to about 55 degrees, less than, equal to, or greater than about 30 degrees, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or about 65 degrees and fishing lure 100 will swim to the right. As another example, a user in control of the jig, can move the jig in such a way that that biasing element 119 on the left side of fishing lure 100 abuts receiving portion 126 on the left side of fishing lure 100. In this orientation, an angle between body portion 102 and tail portion 104 can be in a range of from about 30 degrees to about 65 degrees, about 40 degrees to about 55 degrees, less than, equal to, or greater than about 30 degrees, 31, 32, 33, 34, 36, 37, 38, 39, 40, 41, 42, 43, 44, 45, 46, 47, 48, 49, 50, 51, 52, 53, 54, 55, 56, 57, 58, 59, 60, 61, 62, 63, 64, or about 65 degrees and fishing lure 100 will swim to the left.

Thus a difference between "traditional" fishing lures and fishing lure 100 is that a user can control the lateral movement of fishing lure 100 in additional to vertical movement. The ability to control both lateral and vertical movement can enhance the ability of fishing lure 100 to attract a fish.

The control of the movement of body portion 102 and tail portion 104 can be controlled completely by the user by hand. In some examples, aids can be incorporated to help control the movement. For example, biassing element 119 and receiving portion 126 can be magnetically attracted to each other. The magnetic attraction does not need to be strong but may be enough to connect the respective portions until the user applies force over a threshold value to break the connection thus allowing body portion 102 and tail portion 104 to flip to an opposite orientation (e.g., switch from swimming left to right). A magnetic attraction or other light attraction/adhesion that can be overcome can help a user to maintain the left or right swimming orientation easier.

In some examples, biasing elements 119 can be actuated to control the orientation of body portion 102 relative to tail portion 104. As an example, biasing elements 119 can be extended or retracted to engage a respective receiving portion 126. This can allow for complete control by the user and can "lock in" the left or right swimming orientation for a desired amount of time. While not so limited, actuation of biasing elements 119 can be accomplished using a screw coupled to a biasing element 119 that causes biasing element 119 to move. A user can control actuation with a lever on the jig having a line that couples to biasing element 119, a user could also control actuation electronically with a control that issues a command to a motor that causes biasing element 119 to move.

Exemplary Aspects.

The following exemplary aspects are provided, the numbering of which is not to be construed as designating levels of importance:

Aspect 1 provides a fishing lure, comprising:
   a body portion having a longitudinal axis extending therethrough;
   a tail portion; and
   a jointed connection between the body portion and the tail portion, wherein
   the body portion comprises at least two biasing elements each extending from opposite sides of the body portion at an angle in a range of from about 30 degrees to about 65 degrees relative to the longitudinal axis, the at least two biasing elements each configured to selectively contact opposed surfaces of the tail portion.

Aspect 2 provides the fishing lure of Aspect 1, wherein the at least two biasing elements each extend from opposite sides of the body portion at an angle in a range of from about 40 degrees to about 55 degrees relative to the longitudinal axis.

Aspect 3 provides the fishing lure of any of Aspects 1 or 2, wherein the at least two biasing elements each comprise a bar.

Aspect 4 provides the fishing lure of any of Aspects 1-3, wherein the at least two biasing elements each comprises wood.

Aspect 5 provides the fishing lure of any of Aspects 1-4, wherein the jointed connection comprises:
   a plurality of fasteners affixed to the body portion and tail portion; and
   a pin element extending through the plurality of fasteners.

Aspect 6 provides the fishing lure of any of Aspects 1-5, further comprising eyelets attached to the body portion, the eyelets configured to attached to a jig.

Aspect 7 provides the fishing lure of any of Aspects 1-6, wherein the at least two biasing elements are adapted to selectively restrict movement of the tail portion.

Aspect 8 provides the fishing lure of Aspect 7, wherein the at least two biasing elements selectively restrict movement of the tail portion under control of a lever that can independently restrict movement of the at least two biasing elements or independently extend the at least two biasing elements relative to the longitudinal axis.

Aspect 9 provides the fishing lure of any of Aspects 7 or 8, wherein the lever actuates a screw coupled to an individual biasing element.

Aspect 10 provides the fishing lure of any of Aspects 7-9, wherein the lever is electronically controlled.

Aspect 11 provides the fishing lure of any of Aspects 1-10, wherein the jointed connection is located in a range of from about 50% to about 75% of a total length of the fishing lure.

Aspect 12 provides the fishing lure of Aspect 11, wherein the jointed connection is located in a range of from about 60% to about 70% of the total length of the fishing lure.

Aspect 13 provides the fishing lure of any of Aspects 1-12, further comprising receiving portions on the tail portion each configured to selectively abut one of the at least two biasing elements.

Aspect 14 provides the fishing lure of Aspect 13, wherein the receiving portions each comprise an indentation.

Aspect 15 provides the fishing lure of any of Aspects 13 or 14, wherein the indentation has a major dimension in a range of from about 1 mm to about 5 mm.

Aspect 16 provides the fishing lure of any of Aspects 13-15, wherein the receiving portion and respective biasing element are magnetically attracted to each other.

Aspect 17 provides the fishing lure of any of Aspects 1-16, further comprising a weight at least partially embedded in the body portion.

Aspect 18 provides the fishing lure of any of Aspects 1-17, wherein an overall shape of the fishing lure is designed to resemble a fish.

Aspect 19 provides an assembly comprising:
the fishing lure of any of Aspects 1-18;
a jig to control movement of the fishing lure; and
a connecter between the fishing lure and the jig.

Aspect 20 provides a method of operating the assembly of Aspect 19, the method comprising:
submerging the fishing lure in water;
causing the tail portion to move to at least one of first position or a second position relative to a resting position, wherein in the resting position a longitudinal axis of the tail portion is substantially aligned with the longitudinal axis of the body portion.

What is claimed is:

1. A fishing lure, comprising:
a body portion having a first end, a second end, a first longitudinal axis extending between the first and second ends, and a first curved surface extending across the first longitudinal axis at the second end;
a tail portion having a third end, a fourth end, a second longitudinal axis extending between the third and fourth ends, and a second curved surface extending across the second longitudinal axis at the third end, wherein the first and second curved surfaces generally face each other; and
a single jointed connection between the body portion and the tail portion, wherein
the body portion comprises at least two biasing elements which each comprise a wooden bar, the at least two biasing elements extending from the first curved surface on opposite sides of the first longitudinal axis of the body portion at angles in a range of from about 30 degrees to about 65 degrees relative to the first longitudinal axis, the at least two biasing elements each configured to selectively contact of the second curved surface of the tail portion, and wherein
the tail portion comprises receiving portions on the second curved surface of the tail portion on opposite sides of the second longitudinal axis of the tail portion, the receiving portions each comprising an indentation extending into the second curved surface and each configured to selectively abut a respective one of the at least two biasing elements.

2. The fishing lure of claim 1, wherein the at least two biasing elements each extend from the first curved surface on opposite sides of the first longitudinal axis of the body portion at an angle in a range of from about 43 degrees to about 50 degrees relative to the first longitudinal axis.

3. The fishing lure of claim 1, wherein the jointed connection comprises:
a plurality of fasteners affixed to the body portion and tail portion; and
a pin element extending through the plurality of fasteners.

4. The fishing lure of claim 1, further comprising an eyelet attached to the body portion, the eyelet configured to be attached to a line attached to a jig.

5. The fishing lure of claim 1, wherein the at least two biasing elements are adapted to selectively restrict movement of the tail portion.

6. The fishing lure of claim 1, wherein the jointed connection is located in a range of from about 50% to about 75% of a total length of the fishing lure.

7. The fishing lure of claim 6, wherein the jointed connection is located in a range of from about 60% to about 70% of the total length of the fishing lure.

8. The fishing lure of claim 1, wherein each of the indentations has a major dimension in a range of from about 1 mm to about 5 mm.

9. The fishing lure of claim 8, wherein each of the receiving portions and the respective biasing element are magnetically attracted to each other.

10. The fishing lure of claim 1, further comprising a weight at least partially embedded in the body portion.

11. The fishing lure of claim 1, wherein an overall shape of the fishing lure is designed to resemble a fish.

12. An assembly comprising:
the fishing lure of claim 1;
a jig to control movement of the fishing lure; and
a connecter between the fishing lure and the jig.

13. A method of operating the assembly of claim 12, the method comprising:
submerging the fishing lure in water;
causing the tail portion to move to at least one of a first position or a second position relative to a resting position, wherein in the resting position the second longitudinal axis of the tail portion is substantially aligned with the first longitudinal axis of the body portion.

* * * * *